No. 800,554. PATENTED SEPT. 26, 1905.
M. T. DENNE.
LOCK STITCH SEWING MACHINE.
APPLICATION FILED AUG. 24, 1903.
6 SHEETS—SHEET 1.
Fig. 1.
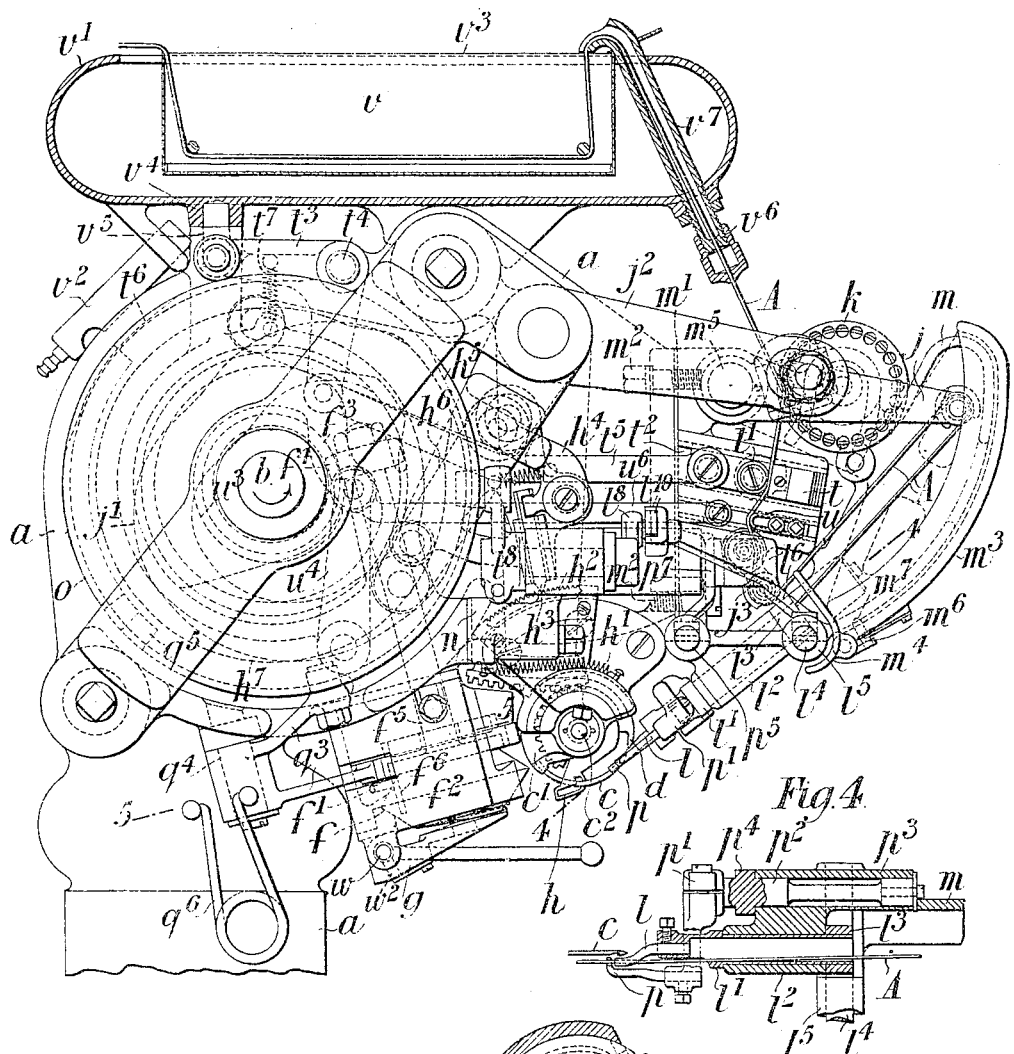
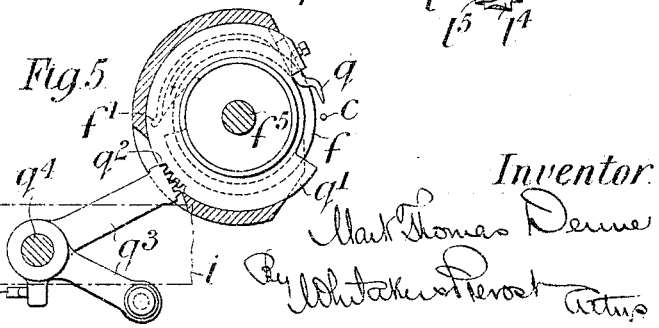
Witnesses
Mary Ferguson
F. H. Hubbard
Inventor
Mark Thomas Denne
By Whitaker & Prevost
Attys

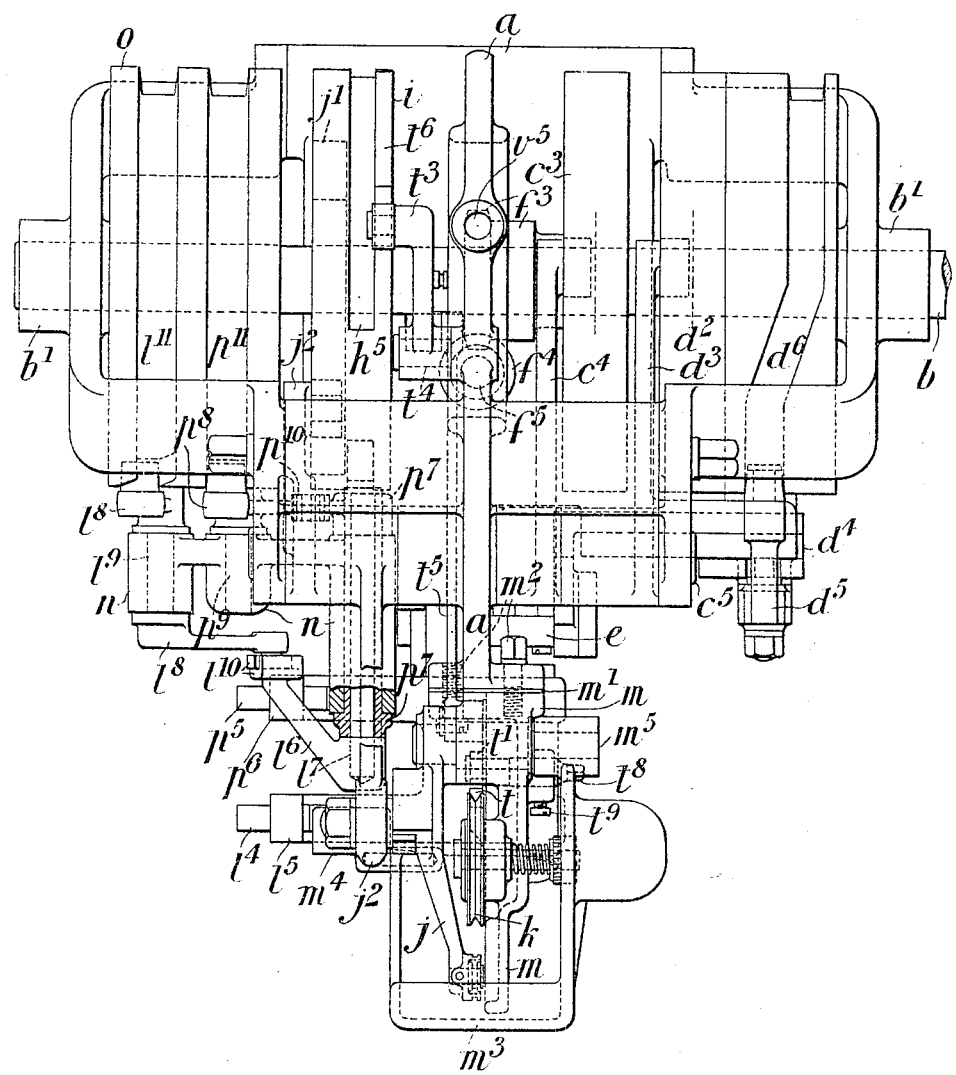

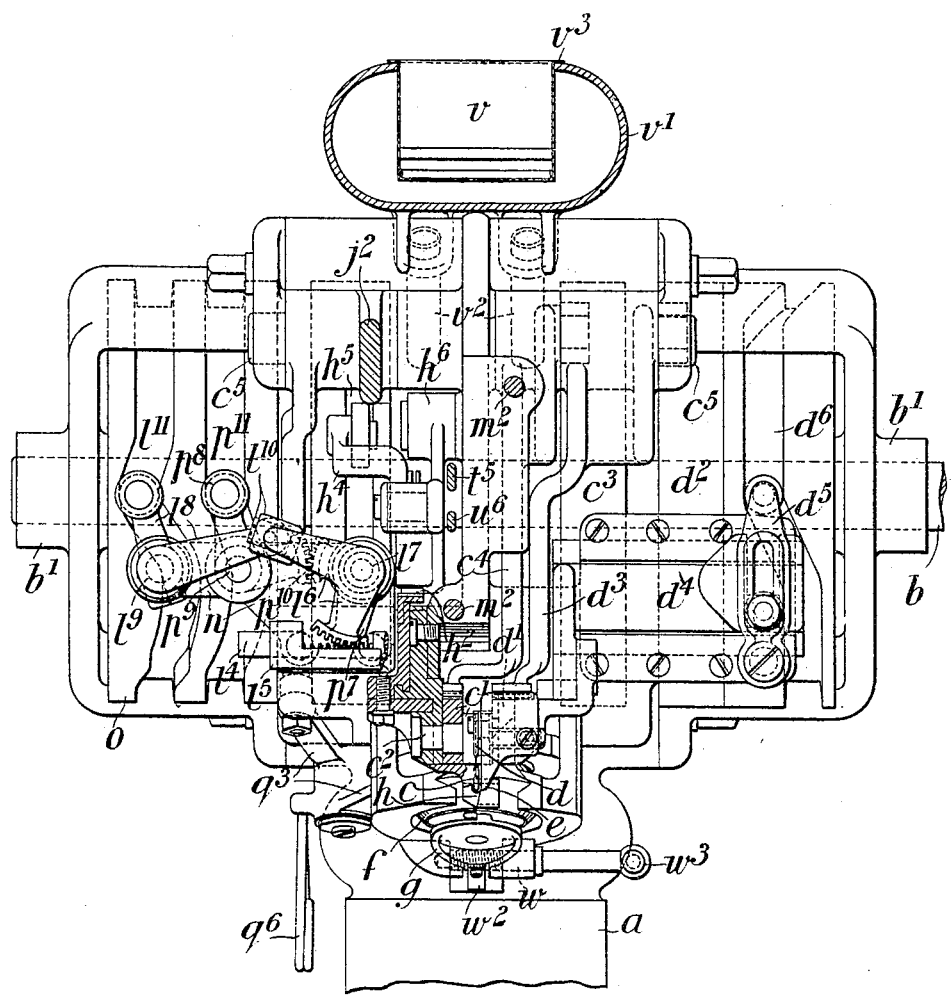

No. 800,554. PATENTED SEPT. 26, 1905.
M. T. DENNE.
LOCK STITCH SEWING MACHINE.
APPLICATION FILED AUG. 24, 1903.

6 SHEETS—SHEET 4.

Witnesses. Inventor.

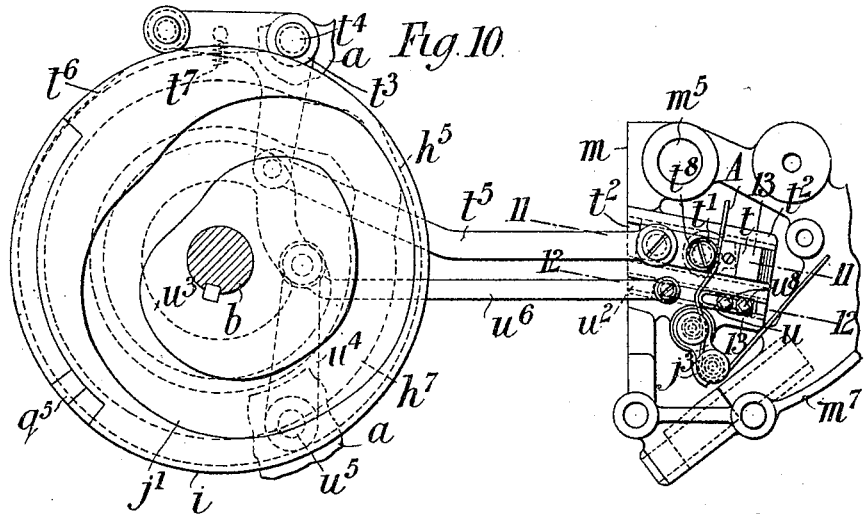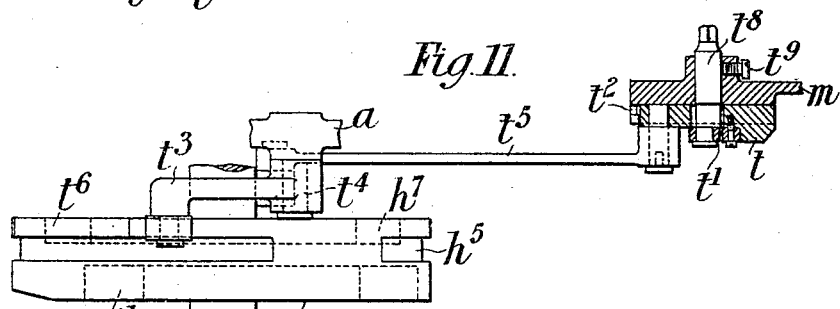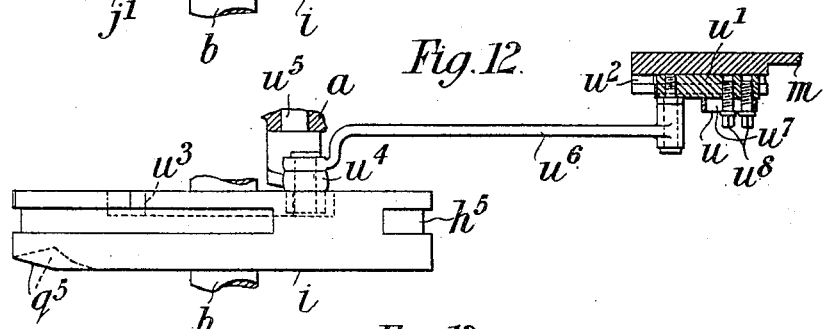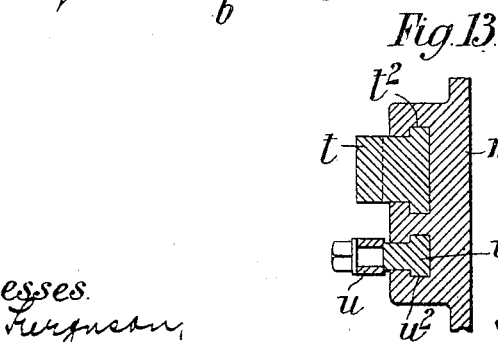

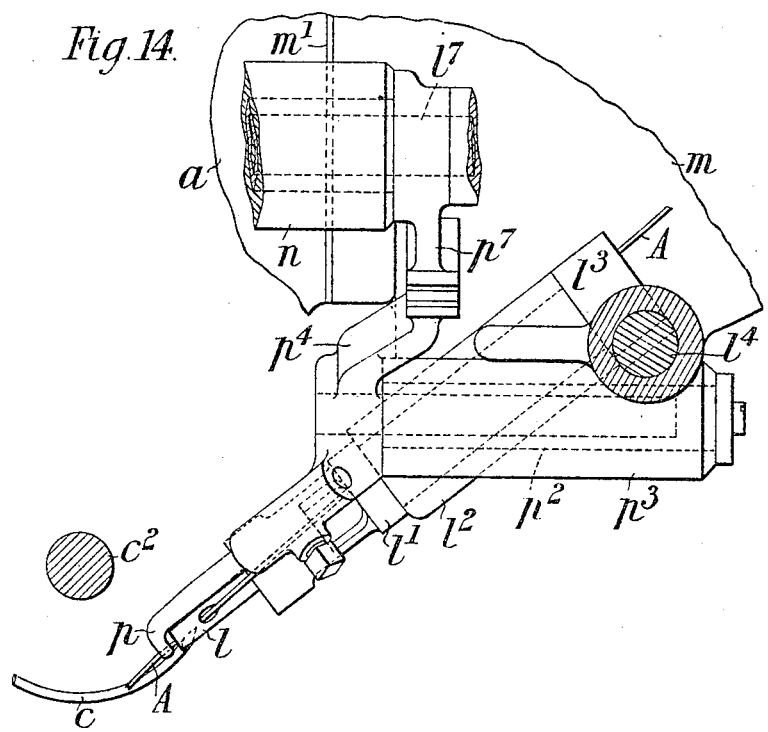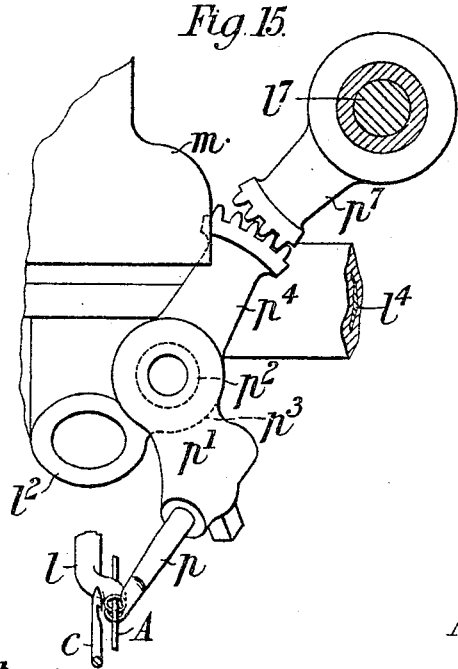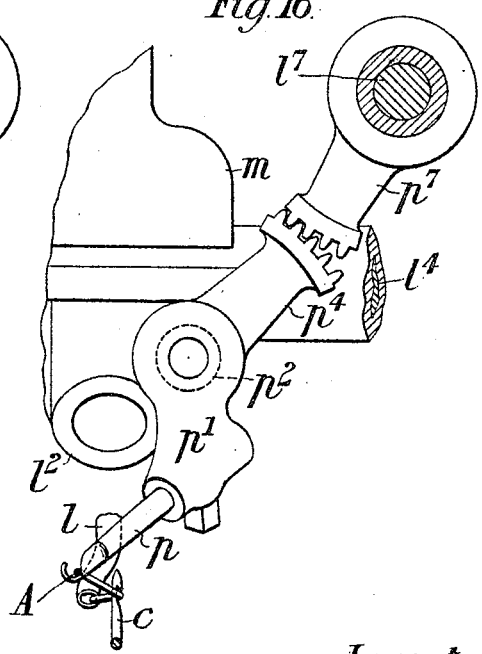

UNITED STATES PATENT OFFICE.

MARK THOMAS DENNE, OF RUSHDEN, ENGLAND, ASSIGNOR TO JOHN CAVE AND SONS, LIMITED, OF RUSHDEN, ENGLAND.

LOCK-STITCH SEWING-MACHINE.

No. 800,554.      Specification of Letters Patent.      Patented Sept. 26, 1905.

Application filed August 24, 1903. Serial No. 170,635.

*To all whom it may concern:*

Be it known that I, MARK THOMAS DENNE, a subject of the King of Great Britain, residing at College street, Rushden, county of Northampton, England, have invented new and useful Improvements in Lock-Stitch Sewing-Machines, of which the following is a specification.

This invention relates to lock-stitch sewing-machines for welting and turn-shoe work, and more particularly of the kind in which a semirotary barbed needle, a semirotary awl or pricker, and a rotary shuttle moving in a plane at right angles to the needle and awl are employed, and comprises the improvements hereinafter described.

Figure 6:
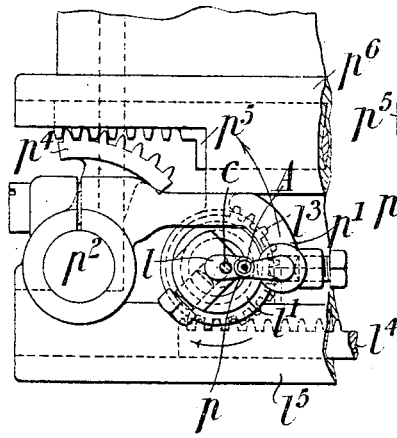
Figure 7:
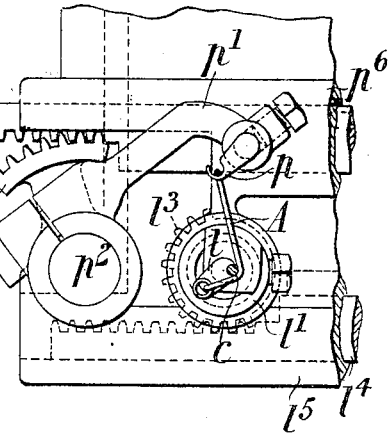
Figure 8:
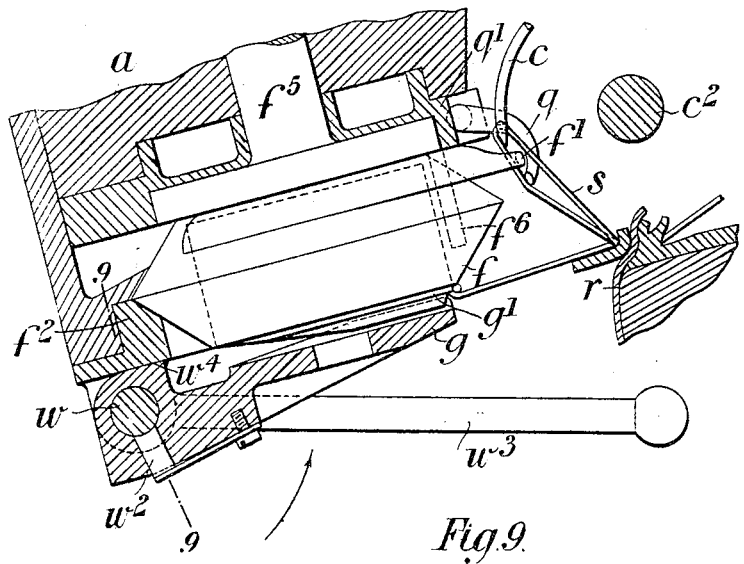
Figure 9:
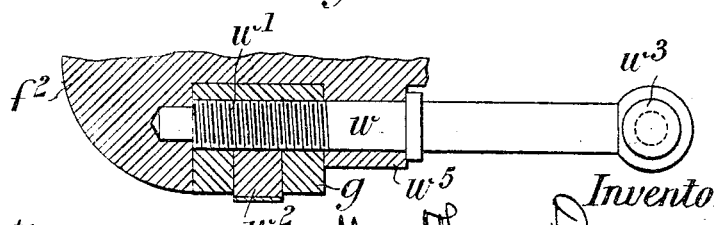

In the accompanying drawings, Figure 1 is a sectional side elevation of a lock-stitch welting or turn-shoe sewing-machine constructed according to my invention. Fig. 2 is a sectional plan of the machine with the wax-pot removed. Fig. 3 is a sectional front elevation of the machine with a bracket carrying the needle-thread-controlling mechanism removed. Fig. 4 is a section on the line 4 4, Fig. 1. Fig. 5 is a section on the line 5 5, Fig. 1. Fig. 6 is a rear elevation illustrating the arrangement of the looper, thread-hook, and needle. Fig. 7 is a similar view to Fig. 6, but showing the parts in a different position. Fig. 8 is a vertical section principally illustrating the arrangement of the loop-opener. Fig. 9 is a section on the line 9 9, Fig. 8. Fig. 10 is a side elevation illustrating the arrangement of the thread-lock and pull-off and their operating mechanisms. Fig. 11 is a sectional plan of the thread-lock, the section being on the line 11 11, Fig. 10. Fig. 12 is a sectional plan of the pull-off, the section being on the line 12 12, Fig. 10; and Fig. 13 is a section on the line 13 13, Fig. 10. Fig. 14 is a sectional side elevation showing a modification in the driving mechanism for the thread-hook. Figs. 15 and 16 are views similar to Figs. 6 and 7 of this arrangement. Figs. 6, 7, 8, 9, and 13, 14, 15, and 16 are drawn to a larger scale than the rest of the figures.

Similar reference-letters indicate corresponding parts throughout the drawings.

$a$ is the main frame of the machine, and $b$ is the main or driving shaft, supported in the removable bearings $b'$ $b'$.

$c$ is the semirotary curved needle supported on the toothed carrier $c'$, designed to be oscillated upon the spindle $c^2$ from the needle-cam $c^3$ through the medium of the toothed bell-crank $c^4$, fulcrumed on the pin $c^5$.

$d$ is the semirotary awl or pricker for feeding the work supported on the toothed carrier $d'$, designed to be oscillated (to grip the work) upon the spindle $c^2$ from the awl-cam $d^2$ through the medium of the toothed bell-crank $d^3$, fulcrumed on the pin $c^5$. The said awl is moved laterally to feed the work by the slide-block $d^4$, lever $d^5$, (adjustably connected to the block,) and cam $d^6$.

$e$ is the channel-guide, also connected to the block $d^4$.

$f$ is the rotary shuttle, having the hook $f'$ for engaging the needle-thread A and mounted in the shuttle-race $f^2$ and driven from the main shaft $b$ by the helical gear-wheels $f^3$ $f^4$, shaft $f^5$, and driver $f^6$.

$g$ is the hinged plate or lid for holding the shuttle-spool $g'$ in position in the shuttle and preventing the same rotating with the latter.

$h$ is the welt-guide for use with welted work, the said guide being pivoted axially with the needle and awl, so that it can turn and be adjusted relatively with the channel-guide $e$ against the tension of its spring $h'$, according to the thickness of the work, the said welt-guide having a segment of teeth $h^2$, designed to be locked by a pawl $h^3$, operated by a lever $h^4$ and cam $h^5$ when the needle is passing through the work and to be free of the pawl when placing work in the machine. The pressure of the welt-guide upon the work while being fed by the awl is also relieved without releasing the pawl $h^3$ by a lever $h^6$, upon which the pawl $h^3$ and lever $h^4$ are mounted, and a cam-groove $h^7$ in a cam-disk $i$.

$j$ is the main take-up lever, actuated from the cam-groove $j'$ in the disk $i$ by the lever $j^2$.

$j^3$ is the auxiliary spring take-up, and $k$ is the needle-thread tension-wheel, around which the needle-thread A passes on its way to the thread-lock hereinafter described.

All the foregoing parts are of known construction.

The improvements will now be described.

$l$ is a looper or device for assisting to thread the needle $c$, the thread-delivery end of said looper being in the form of an eye, as shown in Figs. 4, 6, and 7, and having the needle-thread A passing through it direct from the main take-up $j$. The looper $l$ is carried at one end of a shaft $l'$, mounted in a bearing $l^2$ on a forwardly-projecting bracket $m$, attached to the main frame $a$, the axis of the shaft being tangential to the circular path of the needle. The shaft $l'$ is formed hollow for the passage of the thread from the main take-up $j$ to the looper $l$ and is caused to oscillate the looper at the required time by a toothed segment $l^3$ on the shaft, a rack-bar $l^4$ engaging the said pinion and sliding in a guide $l^5$ on the bracket $m$, a bell-crank $l^6$ fulcrumed by a spindle $l^7$ to a bracket $n$ on the frame $a$ and having one end toothed and engaging the rack-bar $l^4$, a second bell-crank $l^8$ fulcrumed at $l^9$ to the bracket $n$ and having one end engaging the bell-crank $l^6$ by means of a slide-block and guide $l^{10}$ and a cam-groove $l^{11}$ in a disk $o$ on the shaft $b$ engaging a roll on the bell-crank $l^8$.

$p$ is a thread-hook arranged to coöperate with the looper $l$ to thread the needle $c$. The said hook is mounted in a holder $p'$ on a shaft $p^2$, arranged in a bearing $p^3$ in the bracket $m$, so as to be parallel with the looper-shaft $l'$. The shaft $p^2$ is caused to oscillate the thread-hook at the required time by a toothed segment $p^4$ on the said shaft, a rack-bar $p^5$ engaging the said segment and sliding in a guide $p^6$ on the bracket $m$, a bell-crank $p^7$ pivoted on the spindle $l^7$ in the bracket $n$ and having one end toothed and engaging the rack-bar $p^5$, a second bell-crank $p^8$ pivoted at $p^9$ to the bracket $n$ and having one end engaging the bell-crank $p^7$ by means of teeth $p^{10}$ and a cam-groove $p^{11}$ in the disk $o$ engaging a roll on the bell-crank $p^8$. The looper and thread-hook operating mechanisms are so arranged relatively with the needle-operating mechanism that when the needle is in its extreme forward position, as indicated in Figs. 1 and 4, the said looper and thread-hook are in the position shown clearly in Fig. 6—that is to say, with the eye of the looper and the hook in line, so that the thread is engaged with the hook. The further movement of the main shaft $b$ causes the cam-grooves $l^{11}$ and $p^{11}$ to move the looper $l$ and thread-hook $p$ in the direction of the arrows, Fig. 6, to the position shown in Fig. 7. The eye of the looper is placed eccentrically of the looper-shaft or in a cranked position as to the same, so that a movement of the looper-shaft gives such eye a movement in a curved line, and motion is imparted to the looper-shaft to cause the eye, with the thread, to pass downwardly beneath the needle to the opposite side of the same. The thread-hook is secured to an arm in the nature of a crank-arm, so that its movement is also in a curved line, and such movement is upward and toward the opposite side of the needle above the same, the two thereby pulling the thread across into contact with the needle, so that as the latter retires its barb will engage the thread and pull it through the work in the form of a loop in the usual manner. This construction insures the engagement of the thread by the hook of the needle with the minimum amount of movement on the part of the looper and thread-hook.

Instead of the shaft $p^2$, carrying the thread-hook $p$, being driven through the medium of the rack-bar $p^5$, as hereinbefore described, the latter can be dispensed with, the segment $p^4$ and bell-crank $p^7$ being arranged to gear together, as shown in Figs. 14, 15, and 16. By gearing the segment $p^4$ and bell-crank $p^7$ together it will be seen that it is necessary to arrange the shaft $p^2$ parallel with the axis of the said bell-crank instead of arranging it parallel with the shaft $l'$, as hereinbefore described.

Figs. 15 and 16 illustrate the operation of laying the thread in the barb of the needle by the arrangement just described.

$q$ is a device or loop-opener for assisting to form the loop on the needle for the better engagement therewith of the shuttle. This loop-opener is of the form shown clearly in Figs. 5 and 8 and is carried by a ring $q'$, mounted freely upon the shuttle-shaft $f^5$, so as to be concentric with the axis of the shuttle $f$, the point of the said opener extending down so as to engage the loop on the needle at a point below that at which the shuttle-hook $f'$ engages the loop, as shown clearly in Fig. 8. Means suitable for oscillating the ring, and with it the opener, comprise gear-teeth $q^2$ on the ring, a bell-crank $q^3$, fulcrumed at $q^4$ and having at one end a segment of gear-teeth to engage the teeth $q^2$, and a cam-recess $q^5$ on the disk $i$, Figs. 10 and 12, on the shaft $b$, with which recess a roll on the other end of the bell-crank $q^3$ engages, a spring $q^6$, Fig. 1, connected at one end to the said bell-crank and at the other end to the frame $a$, serving to keep the bell-crank in contact with the surface of the disk $i$ and cause it to enter the cam-recess $q^5$. The ring $q'$ is oscillated so that the opener $q$ crosses the path of the needle just below its point as it rises from the work $r$, Fig. 8, to its extreme rear position, carrying the loop $s$ of thread, the needle in its movement drawing one side of the loop over the flattened rear surface of the opener immediately behind the point of the latter, so that the loop is formed triangular, as shown. By the described arrangement it will be seen that the side of the loop extending between the opener and the needle when the latter is at the end of its rear movement, as shown in Fig. 8, will always maintain the same position relatively with the shuttle for the engagement therewith of the shuttle-hook $f'$ notwithstanding that the point at which the loop is connected to the work $s$ may vary, owing to varying thicknesses of the work.

A needle-thread-locking device is employed comprising two blocks $t\ t'$, Figs. 1, 10, and 11, having suitable gripping-surfaces between which the thread passes from the tension-wheel $k$ to a pull-off device hereinafter described. The block $t$ is arranged to slide in a guide $t^2$, Fig. 13, on the bracket $m$ and is actuated to grip the thread by the periphery of the disk $i$ through the medium of a bell-crank-lever $t^3$, fulcrumed at $t^4$ to the frame $a$, and a connecting rod or link $t^5$, a cam-surface $t^6$ being formed on the disk $i$ to allow the grip on the thread to be relieved at the required time by the action of a spring $t^7$ on the lever $t^3$. The block $t'$ is carried by a pin $t^8$ in a hole in the bracket $m$, the part of the pin carrying the said block being formed eccentric to the main part of the pin, so that by rotating the said pin the block can be adjusted relatively with the block $t$.

$t^9$ is a set-screw for locking the pin $t^8$ when adjusted.

For pulling off from the thread-ball the required amount of thread for the needle for each stitch a pull-off device is employed in the form of a bar or block $u$, Figs. 1, 10, 12, and 13, carried upon a slide-block $u'$, working in a guide $u^2$ upon the bracket $m$ and actuated by a cam-groove $u^3$ in the disk $i$ through the medium of a lever $u^4$, fulcrumed at $u^5$ to the frame $a$, and a connecting rod or link $u^6$. The bar $u$ is adjustable upon the block $u'$, it being for this purpose provided with a slot $u^7$, through which pass set-screws $u^8$ into the said block. By adjusting the bar upon the block it will be seen that more or less thread can be pulled off at each backward movement of the bar, according as it strikes the thread early or late during such movement.

The thread-measuring devices herein shown and described are not herein specifically claimed, as they form the subject-matter of a divisional application filed by me May 9, 1904, and given Serial No. 207,123.

From the foregoing description it will be seen that the whole of the needle-thread-controlling mechanism—viz., the looper $l$, the thread-hook $p$, the main take-up $i$, the spring take-up $j$, the thread-lock $t$ $t'$, the pull-off $u$, and tension-wheel $k$—are arranged at the front of the machine, whereby they are rendered easy of access, and by mounting them upon a bracket, such as $m$, insulated by a suitable non-conductor of heat, such as mica, as indicated at $m'$, from the main frame $a$ the heat which is employed to facilitate the working of the waxed needle-thread is prevented from being communicated to the said main frame.

$m^2$ $m^2$ are screws for securing the bracket $m$ to the frame $a$.

$m^3$, Figs. 1 and 2, is a movable guard for covering the front of the bracket $m$ and protecting the main take-up $j$. The said guard is also provided with an additional piece $m^4$ for covering the rack-bar $l^4$ and toothed portion of the bell-crank $l^6$ and is pivoted at $m^5$ to the bracket $m$, a spring-catch $m^6$ being provided on the guard, engaging a notch $m^7$, Figs. 1 and 10, in the bracket $m$ to lock the guard $m^3$ in its lowered position, as shown in Fig. 1.

$v$ is a wax-pot arranged at the upper part of the machine for waxing the needle-thread A and supported within a water-jacket $v'$, designed to be heated by Bunsen burners $v^2$ $v^2$, Figs. 1 and 3, the said wax-pot having a rim $v^3$, whereby it is supported within the said jacket, which is attached to the frame $a$ by a pin $v^4$ entering a hole $v^5$, Figs. 1 and 2.

$v^6$, Fig. 1, is a stripping device through which the thread passes to the tension-wheel $k$ and which serves to remove the superfluous wax from the thread A. The device $v^6$ is connected to the lower end of a tube $v^7$, attached to the outer wall of the jacket $v'$, and passes through the said jacket and over the top edge of the wax-pot, as shown clearly in Fig. 1. By the described construction it will be seen that the wax-pot can be easily removed without disturbing the tube $v^7$ and stripping device $v^6$.

The thread-waxing mechanism above described is not claimed specifically herein.

For simultaneously closing and locking the hinged plate or lid $g$ after placing the shuttle-spool in position within the shuttle the following means are employed—that is to say, the pin $w$, Figs. 8 and 9, upon which the said plate hinges, is formed with a screw-thread $w'$, engaging a corresponding thread in a hole in the said plate, and a spring-block $w^2$ is arranged to bear upon the said pin. By this arrangement, assuming the plate to be in the open position, if the pin be turned in the direction of the arrow, Fig. 8, by the arm $w^3$ the friction between the block $w^2$ and the said pin will cause the plate $g$ to move into the position shown in the said figure, where it will be stopped by the surface $w^4$ on the plate coming into contact with the opposing face of the shuttle-race. The continued movement of the arm $w^3$ then results in a slight relative screwing movement between the pin $w$ and the plate $g$, thereby drawing the said plate tightly against the side of the lug $w^5$ on the shuttle-race and locking it.

The operation of the improved machine is as follows: Assume the parts to be in the position shown in Figs. 1, 2, and 3—that is to say, with the needle $c$ in its extreme forward position and the awl or pricker $d$ in its extreme backward position. If the shaft $b$ be rotated in the direction of the arrow, Fig. 1, the looper $l$ and thread-hook $p$ will be moved to engage the needle-thread A with the needle $c$ in the manner hereinbefore described. The needle then will move back through the work, drawing the thread in the form of a loop, and just before reaching its extreme backward position the loop-opener $q$ engages with the loop, the continued movement of the needle producing the triangular loop $s$, as hereinbefore described. The shuttle $f$ then engages the loop, the needle and loop-opener simultaneously releasing the said loop. The loop is then carried around the shuttle, thereby inclosing the shuttle-spool thread in the usual manner, the main take-up $j$ drawing the needle-thread through the work over the shuttle-thread. When the main take-up $j$ reaches its highest point, the thread-lock $t$ $t'$ opens and the pull-off $u$ pulls off the thread for the next stitch. The needle $c$ then again moves forward, the awl or pricker $d$ during the first part of such movement feeding the work the length of the stitch required, the needle then passing through the work to the position shown in the drawings, thus completing the cycle of operations for the production of one stitch.

Having now particularly described and ascertained the nature of my said invention and in what manner the same is to be performed, I declare that what I claim is—

1. In a sewing-machine of the kind hereinbefore described the combination with a semirotary needle and a main take-up device of a looper the thread-delivery end of which is in the form of an eye for the passage of the needle-thread, a hollow shaft supporting the looper and having its axis tangential with the circular path of the needle and through which shaft the needle-thread passes direct from the said main take-up to the looper, a thread-hook for coöperating with the looper to thread the needle, a shaft supporting the same and arranged parallel with the looper-shaft, and means for oscillating the looper and thread-hook shafts each comprising a toothed segment on the shaft, a rack-bar gearing therewith, a toothed bell-crank gearing with the rack-bar, another bell-crank engaging the toothed bell-crank and a cam on the main shaft engaging the second bell-crank, substantially as described.

2. In a machine of the kind hereinbefore described the combination with a semirotary needle and a main take-up device of a looper the thread-delivery end of which is in the form of an eye for the passage of the needle-thread, a hollow shaft supporting the looper and having its axes tangential with the circular path of the needle and through which shaft the needle-thread passes direct from the said main take-up to the looper, a thread-hook for coöperating with the looper to thread the needle, means for oscillating the looper comprising a toothed segment on the shaft, a rack-bar gearing therewith, a toothed bell-crank gearing with the rack-bar another bell-crank engaging the toothed bell-crank and a cam on the main shaft engaging the second bell-crank and means for oscillating the thread-hook shaft comprising a toothed segment on the shaft, a toothed bell-crank gearing with the said segment another bell-crank engaging the toothed bell-crank and a cam on the main shaft engaging the second bell-crank, substantially as described.

3. In a sewing-machine of the kind hereinbefore described the combination with a semirotary needle and a shuttle rotating in a plane at right angles to the needle of an oscillating loop-opener, moving in a curved path about the axis of rotation of the shuttle, and means for operating it from the main shaft of the machine, the said opener being designed to enter the loop of thread carried by the needle, the continued movement of the needle drawing one side of the loop over the opener so that the loop is formed triangular, substantially as, and for the purpose, described.

4. In a sewing-machine of the kind hereinbefore described the combination with a semirotary needle and a shuttle rotating in a plane at right angles to the needle of an oscillating loop-opener a ring concentric with the shuttle-axis supporting the said opener and having gear-teeth, a toothed bell-crank gearing with the teeth in the ring, a cam on the main shaft of the machine with which the bell-crank engages and a spring for keeping the latter in contact with the cam, the said opener being designed to enter the loop of thread carried by the needle, the continued movement of the needle drawing one side of the loop over the opener so that the loop is formed triangular substantially as, and for the purpose, described.

5. In a sewing-machine of the kind hereinbefore described the combination with the shuttle-race of a hinged plate or lid for holding the spool in position in the shuttle, of a screwed hinged pin, a screw-threaded hole in the said lid engaging the screw on the pin and a spring-block bearing upon the pin, substantially as, and for the purpose, hereinbefore described.

6. In a sewing-machine of the class described, the combination with the needle, of a shuttle and means for rotating the same, a loop-opener coöperating with said shuttle and means for oscillating the same, the said loop-opener when engaging the needle-thread moving in the opposite direction to the movement of the shuttle, substantially as described.

7. In a sewing-machine of the class described, the combination with the needle, of a looper and thread-hook normally lying in close juxtaposition at one side of the path of the needle and in the hook side of the needle, the construction including provisions for moving the looper and thread-hook to the opposite side of the needle one below and the other above the needle, whereby the thread is drawn tightly against the needle below its hook, substantially as described.

8. In a sewing-machine of the class described, the combination with the needle, of a looper having its thread-engaging end in the form of an eye for the passage of the thread, and a thread-hook, the two when in a state of rest lying together at the hook side of the path of the needle, the construction including provisions for simultaneously moving the looper and thread-hook from this position to the opposite side of the needle, one above and one below the needle, substantially as described.

9. In a sewing-machine of the class described, the combination with the needle, of a looper having its thread-engaging end in the form of an eye for the passage therethrough of the thread, said eye being located eccentrically as to the main body of the shaft, said shaft having its axis tangential to the path of the needle, and a thread-hook normally on the hook side of the path of the needle, the construction including means for simultaneously moving the looper and thread-hook to the opposite side of the needle, substantially as described.

10. In a sewing-machine of the class described, the combination with the needle, of a looper having its thread-delivery end in the form of an eye, said eye being eccentric to the looper-shaft, and a thread-hook having its thread-engaging end connected thereto by a crank construction, the two thread-hook shafts being substantially parallel, substantially as described.

11. In a machine of the class described, the combination with the needle, of a looper having a cranked or eccentric end formed with an eye for the thread to pass therethrough, a thread-hook having a thread-engaging end connected therewith by a crank construction, the looper-shaft and thread-hook shaft being parallel, and means for rotating the said shafts in opposite directions, substantially as described.

MARK THOMAS DENNE.

Witnesses:
JAMES FERRABEE,
GEORGE HERBERT PERKINS.